United States Patent
Scagliarini

(10) Patent No.: US 10,451,016 B2
(45) Date of Patent: Oct. 22, 2019

(54) METHOD FOR PRODUCING AN IMPROVED FILTER FOR INJECTORS OF FUEL, OILS, SOLUTIONS, ADDITIVES AND FLUIDS IN GENERAL, AND FILTER THUS PRODUCED

(71) Applicant: GVS S.P.A., Zola Predosa (BO) (IT)

(72) Inventor: Marco Scagliarini, Bologna (IT)

(73) Assignee: GVS S.P.A., Zola Predosa (BO) (IT)

( * ) Notice: Subject to any disclaimer, the term of this patent is extended or adjusted under 35 U.S.C. 154(b) by 118 days.

(21) Appl. No.: 15/512,553

(22) PCT Filed: Sep. 17, 2015

(86) PCT No.: PCT/IB2015/057152
§ 371 (c)(1),
(2) Date: Mar. 18, 2017

(87) PCT Pub. No.: WO2016/046700
PCT Pub. Date: Mar. 31, 2016

(65) Prior Publication Data
US 2017/0298885 A1 Oct. 19, 2017

(30) Foreign Application Priority Data

Sep. 22, 2014 (IT) .............................. MI2014A1640

(51) Int. Cl.
*F02M 61/16* (2006.01)
*B01D 29/11* (2006.01)
(Continued)

(52) U.S. Cl.
CPC ......... *F02M 61/165* (2013.01); *B01D 29/111* (2013.01); *B01D 29/31* (2013.01); *B01D 39/16* (2013.01); *B01D 2201/12* (2013.01)

(58) Field of Classification Search
CPC ...... F02M 61/165; B01D 29/31; B01D 39/16; B01D 29/111; B01D 2201/12
(Continued)

(56) References Cited

U.S. PATENT DOCUMENTS 4,552,657 A * 11/1985 Ogawa ................. A01K 63/045
210/167.22
5,335,863 A 8/1994 Degrace

FOREIGN PATENT DOCUMENTS

DE 3718068 C1 6/1988
DE 3939824 A1 6/1990
(Continued)

OTHER PUBLICATIONS

International Search Report and Written Opinion dated Jan. 22, 2016 for PCT/IB2015/057152 to GVS S.P.A. filed Sep. 17, 2015.

*Primary Examiner* — Madeline Gonzalez
(74) *Attorney, Agent, or Firm* — Vorys, Sater, Seymour and Pease LLP

(57) ABSTRACT

Method for producing a filter for injectors of fuel, oil, solutions, additives and fluids in general, for example for braking and transmission systems. The filter including an element of plastic material and having a tubular shape, open at opposite ends, internally hollow and having on one wall of its internal cavity a plurality of projections spaced apart from one another. These projections interacting with portions of a filter element of the pleated type associated with this tubular element and capable of filtering the fluid circulating through the tubular element. The filter element and the tubular element to form a single filter body by being co-moulded, the filter element being incorporated and completely positioned within the tubular element, but having portions of filter surface area free of this tubular element to allow passage and filtration of circulating fluid.

20 Claims, 4 Drawing Sheets

(51) Int. Cl.
*B01D 29/31* (2006.01)
*B01D 39/16* (2006.01)

(58) Field of Classification Search
USPC ....... 210/493.1, 439, 446; 239/575, DIG. 23
See application file for complete search history.

(56) References Cited

FOREIGN PATENT DOCUMENTS

| | | |
|---|---|---|
| EP | 0916378 A2 | 5/1999 |
| EP | 1275841 A1 | 1/2003 |
| GB | 2026602 A | 2/1980 |
| GB | 2227524 A | 8/1990 |

\* cited by examiner

METHOD FOR PRODUCING AN IMPROVED FILTER FOR INJECTORS OF FUEL, OILS, SOLUTIONS, ADDITIVES AND FLUIDS IN GENERAL, AND FILTER THUS PRODUCED

CROSS-REFERENCE TO RELATED APPLICATIONS

This is a § 371 National Stage Application of International Application No. PCT/IB2015/057152 filed on Sep. 17, 2015, claiming the priority of Italian Patent Application No. MI2014A001640 filed on Sep. 22, 2014.

FIELD OF THE INVENTION

The present invention relates to a method for producing a filter for injectors of fuel, oils, solutions, additives and fluids in general, and for systems such as braking and transmission systems, and to a filter thus produced, according to the preambles of the principal claims.

BACKGROUND OF THE INVENTION

The present description is provided with reference to the filtration of liquids such as fuels or oils for applications in vehicles or industrial machinery. However, the invention is also applicable to the field of the filtration of fluids in general, including liquids such as water and gases such as gases for medical use.

As is known, in internal combustion engines having any kind of fuel supply, there is a known method of including a filter in the conduit supplying fuel to each injector of the engine. This filter is also used in systems for supplementing the fuel with additives such as urea, the product known under the trade name of Eolis, or other additives for reducing NOx emissions. This is done in order to arrest and capture any impurity present in the fluid (fuel or additive, for example) circulating in the conduit before it reaches the injectors, as this could cause known problems: for example, in a diesel engine, the injectors might become partially blocked, resulting in imperfect combustion of the fuel and the consequent discharge of fumes with a high content of unburnt particles from the system concerned.

A similar problem, namely the presence of impurities in the circulating fluid, is present in braking systems, particularly those of the ABS type, said problem being resolved, as in the aforesaid systems for supplying fuel to injectors, by placing filters in the brake fluid conduits to capture the aforesaid impurities.

Finally, problems with impurities have also been present in the oil of transmission systems (in dual-clutch transmissions, for example), where the aforesaid impurities could interfere with the correct operation of the gearing, thereby preventing the safe and correct use of the vehicle or device comprising this system.

Similar problems are present in supply lines for the circulation of gases, such as gases for medical use (oxygen, for example) or other fluids (such as water), where the fluid is required to be particularly pure for the purposes of its use downstream of the filter (for example, during the production of beverages such as beer).

SUMMARY OF THE INVENTION

For the filtration of fuel and oils, filters capable of operating for the aforementioned purposes are described in various patent documents: for example U.S. Pat. No. 5,335, 863, DE3718068 and DE3939824 describe a filter comprising an annular element associated with a separate filter element, said filter element comprising a filter screen having a very fine particle size or mesh, wrapped around to form a cylindrical shape. This filter also comprises an outer support or frame placed around the filter element to stiffen it.

EP916378, in the name of the present applicant, which forms the preamble of the principal claim, describes a filter of the aforementioned type comprising an annular element made of plastic material and provided internally with projections whose adjacent sides, spaced apart, form an opening having a radiating configuration, into which is inserted a filter element which projects from the annular element. The filter element is of the type which is pleated on its surface, and is coupled rigidly to the annular element by the interaction of its folded parts with the aforesaid projections. The folds of the filter element form filter pockets.

More particularly, the filter described in EP916378 is produced by overmoulding the annular element on to the filter element. In this production process, said filter element is produced separately, after which procedure it is placed (at least partially) in a mould into which the fixed plastic material is then introduced, this plastic material then setting and consequently becoming attached to the filter element so as to form said annular element.

Additionally, the filter element has a substantially conical shape and, as mentioned above, projects from the annular element.

Although the production process described in EP916378 can be used to produce a filter which is highly effective in the filtration of the circulating fluid (in the conduit where this filter is fitted), it requires the annular element and the filter element to be made separately and only coupled together afterwards, while also requiring the annular element to be fitted with a metal collar and requiring the filter (as a whole) to have sealing elements capable of interacting with the wall of the conduit in which it is placed, so as to form a seal with this wall.

The known solution therefore requires separate production operations for the two main components of the filter (the annular element and the filter element) and their subsequent assembly. Consequently it is also necessary to provide stocks of the aforesaid components. Overall, this leads to an increase in the cost of sales of the end product (the filter).

Furthermore, since the filter consists of components which were originally separate from one another, problems may arise due to their separation at any stage of production or assembly of the system using the finished filter.

Finally, the positioning of the filter element in the mould for the purpose of overmoulding with the plastic material requires particular attention, in order to maintain a desired configuration of the filter element while preventing its crushing during the movement and moulding of this material, and to prevent the deposition of impurities, dust or other substances on said filter element during its movement towards the mould.

DESCRIPTION OF THE INVENTION

The object of the present invention is to provide a method for producing a filter for injectors of fuel, oils, solutions, fluid additives in general whether liquid or gaseous, and for systems such as braking systems, in particular those of the ABS type, and transmission systems, and for producing a filter of this type which is improved relative to known production processes and filters and which can overcome the aforementioned drawbacks of these solutions.

In particular, an object of the invention is to provide a filter of the aforesaid type which has lower production costs, the manipulation of which filter is limited in the course of its production and simplified after its production.

Another object is that of providing a filter of the aforesaid type in which the filter element has greater mechanical rigidity and total protection from external impact, relative to the known solutions.

A further object of the invention is that of providing a filter of the aforesaid type in which the attachment of the filter element to the element supporting it is ensured.

These and other objects, which will be evident to those skilled in the art, are achieved by a filter according to the attached claims.

BRIEF DESCRIPTION OF THE DRAWING

To facilitate the understanding of the present invention, the following drawings are appended purely by way of non-limiting examples, in which drawings.

DETAILED DESCRIPTION OF THE PREFERRED EMBODIMENTS

Figure 1:
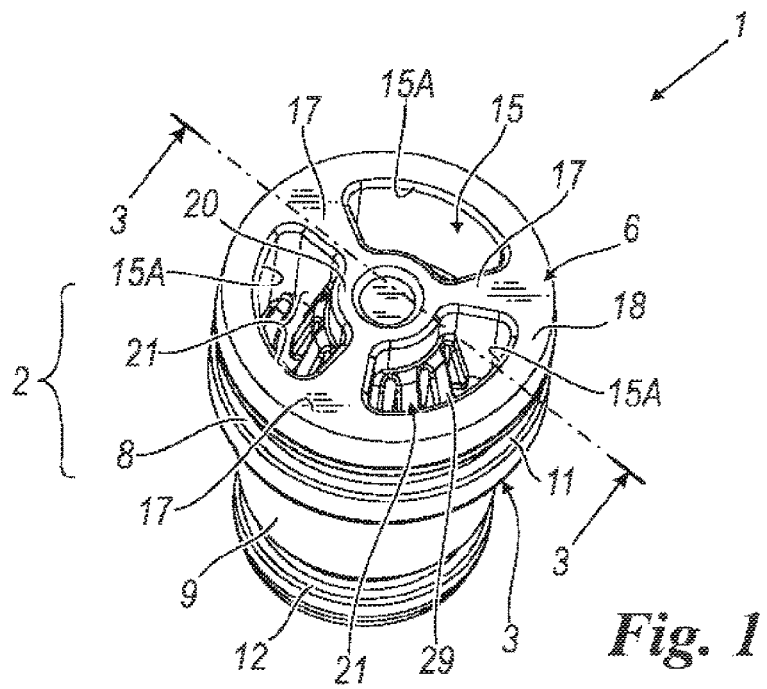
FIG. 1 shows a perspective view from above of a filter according to the invention.
Figure 2:
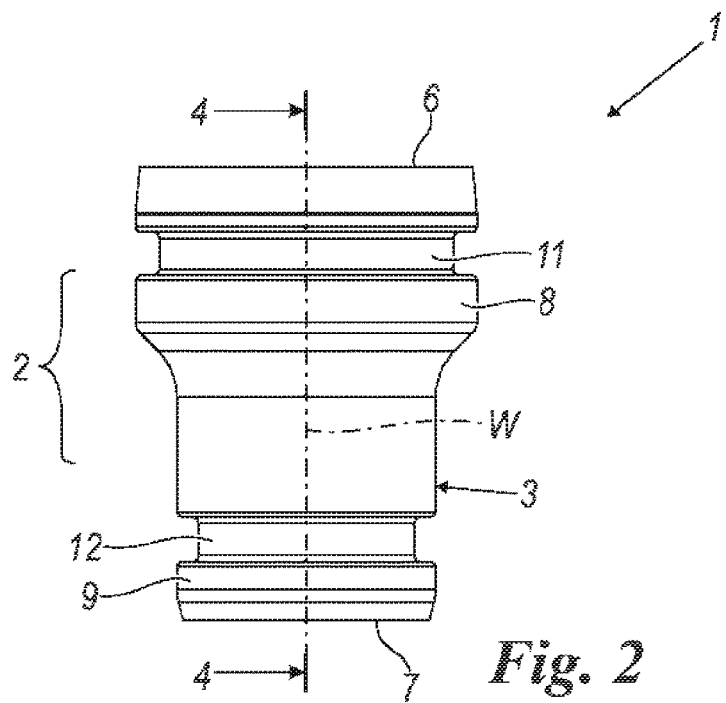
FIG. 2 shows a front view of the filter of FIG. 1.
Figure 3:
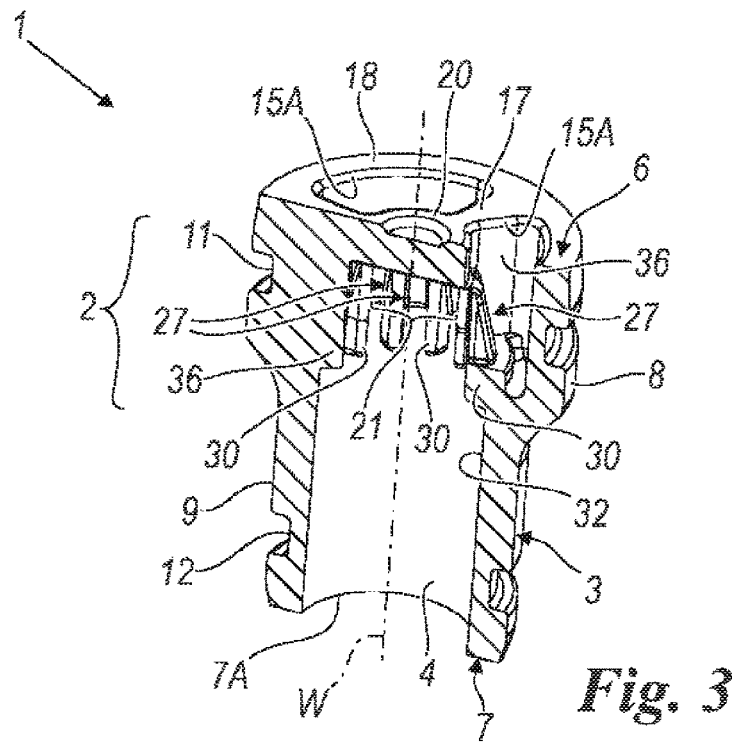
FIG. 3 shows a view in section along the line 3-3 of FIG. 1.
Figure 4:
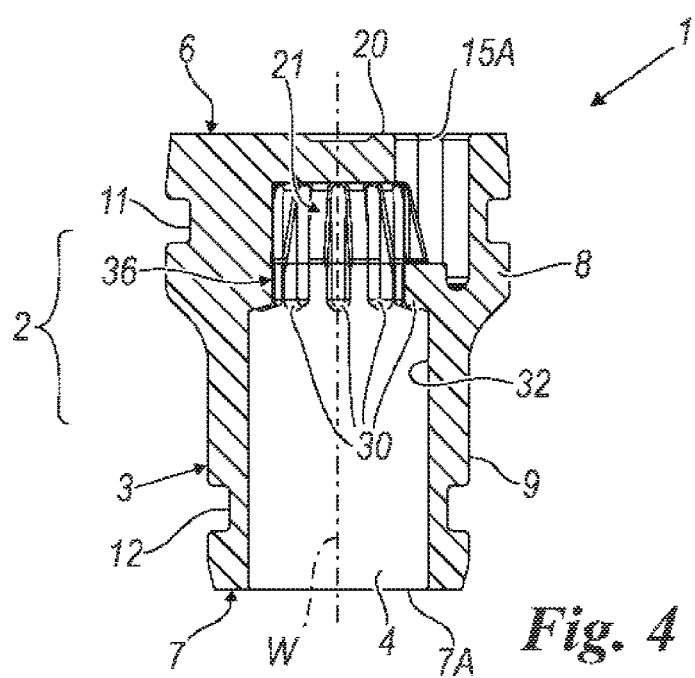
FIG. 4 shows a view in section along the line 4-4 of FIG. 2.
Figure 5:
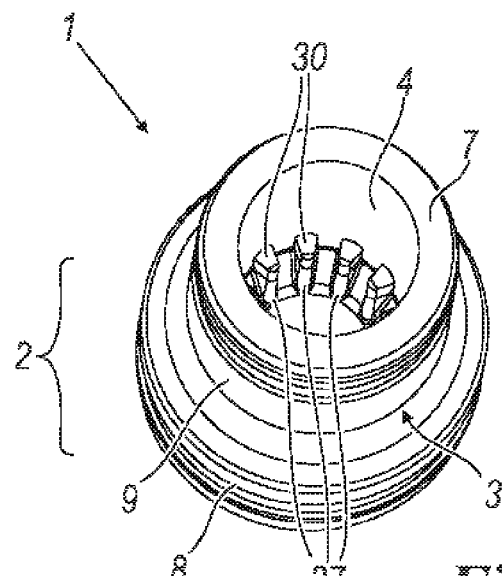
FIG. 5 shows a perspective view from below of the filter of FIG. 1.
Figure 6:
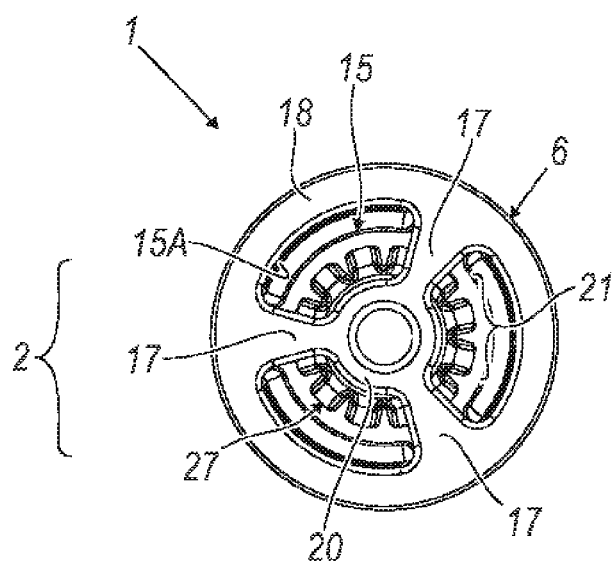
FIG. 6 shows a view from above of the filter of FIG. 1.
Figure 7:
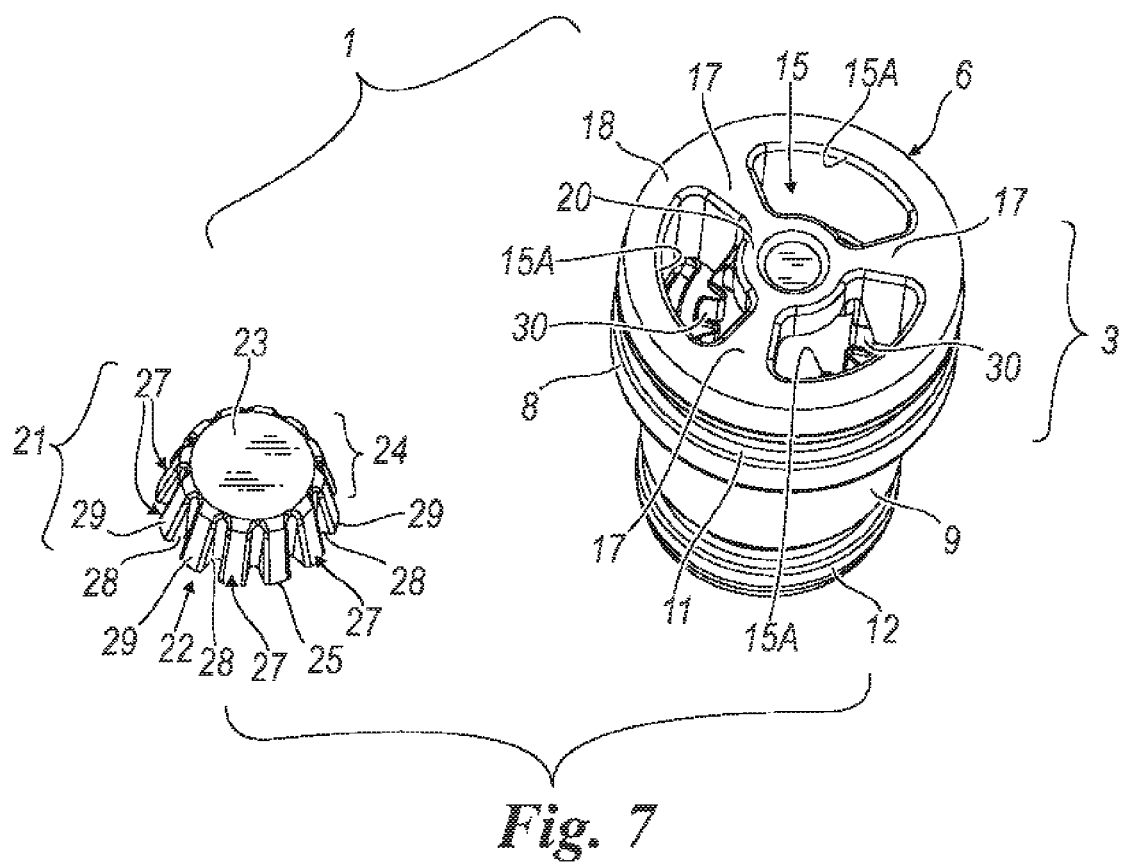
FIG. 7 shows a perspective view of the separate components of the filter of FIG. 1.
Figure 8:
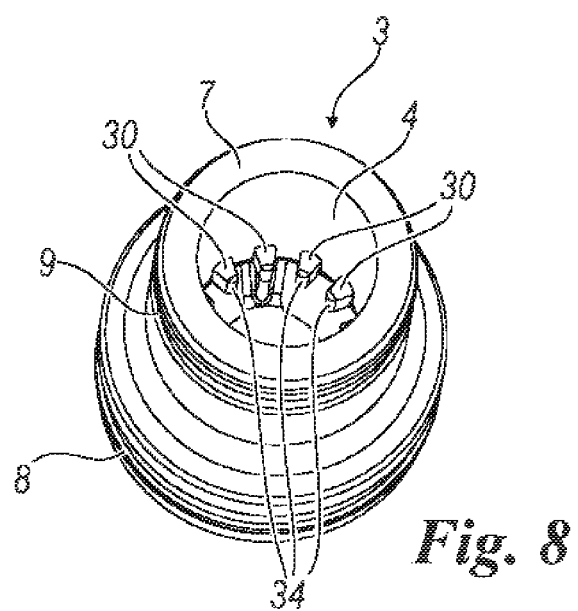
FIG. 8 shows a perspective view from below of a component of the filter of FIG. 1.

With reference to the aforementioned figures, a filter of the aforesaid type is indicated in a general way by 1, and comprises a body 2. This body, in turn, comprises a tubular element 3 of plastic material which is internally hollow at 4 and has a first end 6 and a second end 7, both of which are open. This hollow tubular element has an outer surface of variable cross section, which is wider at a first portion 8 near the first end 6 and narrower in a second portion 9 near the second end 7. In the embodiment shown in the figures, these portions provide recesses 11 and 12 respectively, capable of accommodating corresponding sealing elements (not shown). In other embodiments of the invention, however, these recesses may not be provided, or may each contain more than one sealing element (O-ring).

Sealing is provided between said elements or the portions 8 and 9 and corresponding conduit walls (not shown) with which the filter 1 is associated in a known way, such as conduits for supplying a fuel (for example petrol or diesel fuel) to the injectors of an internal combustion engine, or conduits of a braking system in which the filter 1 is used to capture any impurities in the fluid circulating in these conduits.

The first end 6 has a hole 15 partially blocked by arms or spokes 17 running from an edge 18 of this end (or a position near this edge) and connected to a central body 20 positioned along the longitudinal axis W of the filter body 2. These arms or spokes 17 are spaced apart at equal intervals (of about 120°, for example, as in the figures in which there are three of these components, or 90° if there are four of them, or 180° if there are two of them) and define partial openings 15A connected to the internal cavity 4 of the tubular element 3 (or of the body 2 of the filter 1).

On the other hand, the second end 7 has one opening 7A. A fluid present in the conduit in which the filter 1 is placed can enter and leave the cavity 4 of the tubular body 2 through the latter opening and through the aforementioned 15° partial openings.

Within the aforesaid cavity 4 there is a filter element 21, which in the example is centred on the axis W (but does not necessarily have to be), and which can be struck by the flow of the circulating fluid (passing through the aforementioned cavity 4) and can capture any impurities contained therein. The filter element is of the type comprising a body 22 which, in the embodiment shown in the figures, has a tapered shape, in particular a frustoconical shape; this body has a flattened end part 23 (orthogonal to the axis W) from which there extends a filter wall 24 positioned so as to widen at the free end 25 (thereby establishing the frustoconical shape of the filter). This wall is "pleated", and therefore comprises a plurality of folds 27 which can increase the filter surface area. These folds 27 define between them, when viewed from outside the element 21, recesses 28 alternating with fins 29. Under the folds 27, and under the fins 29 in particular, there are brackets of substantially triangular shape 30 projecting from a wall 32 of the cavity 4 of the tubular element 3, said brackets 30 each having a tapered free end 34. The folds bear on these ends. The brackets are fixed to the folds 27.

According to the invention, the tubular element 3 and the filter element 21 are produced by co-moulding, that is to say by a single forming operation carried out completely in an injection mould for plastic material, causing the element 21 to be placed entirely inside the tubular element 3 and fastened thereto. It should be noted that the term "co-moulding" denotes an injection moulding operation for producing a product (the filter 1) without introducing into the mould any previously shaped element for subsequent fastening to an external body of plastic material. In other words, this term signifies a moulding operation in which the forming of any component of the end product (in this case, the tubular element 3 and the filter element 21) into the desired shape takes place directly in the mould without the need to introduce a pre-shaped component into the mould.

After the co-moulding operation, the filter element 21 is entirely within the cavity 4 in the first portion 8 of the tubular element, and is protected by this portion from any impact on the filter 1; this filter element 21 is made in one piece with the tubular element 3, with which it is associated at the brackets 30 and at the central body 20 after moulding (which is performed by injection). This filter element 21 is thus completely protected from any impact that may occur during installation in the position of use.

By contrast with the known prior art solutions, and particularly with EP916378, the tubular element 3 completely surrounds the filter element 21 on all sides and also protects it from any impact that may occur in the direction of the longitudinal axis W and the first end 6, because of the presence at this end of the arms 17 and of the central body 20 positioned next to the flattened part 23 of the body 22 of the filter element 21.

It should be noted that, in spite of the co-moulding, much of the filter surface area (defined by the wall 24) of the filter element 21 is free of the (plastic) material of the tubular element: only some parts 36 of the latter, projecting towards the axis W of the element 3 and in a number corresponding to the arms 17 visible at the first end 6 of the tubular element 3, occupy some recesses 28 in the folds 27, that is to say a number of recesses equal to the number of the aforesaid arms. These parts are fixed to the wall 24 because they are co-moulded with it. The rest of the filter surface area or wall 24 is free of material, and is located next to the partial openings 15A provided at the first end 6 of the tubular element 3.

Thus, although the filter element 21 is co-moulded with the tubular element 3 and is inside the latter, being laterally protected by the first portion 8 of this element 3, there is still an optimal free surface area for filtering the fluid circulating within the cavity 4, while still allowing it to pass towards the corresponding injector or the braking or transmission members of the respective conduit of the system in which the filter 1 is fitted.

Because of the invention, the filter 1 is truly made in one piece, thereby facilitating its transport and its positioning in the respective conduit. Being co-moulded, its components are made directly by a single moulding operation, and there is no need to suspend this operation in order to introduce the filter element into the mould, which would slow down the industrial production of the filters 1.

According to the invention, the method for producing the filter 1 by the co-moulding operation is executed by supplying to the mould a mesh portion, which is flat, for example, and is capable of forming the filter element 21, or by creating this mesh portion directly in the mould by injecting material in the fluid state into the mould. In the mould, this mesh portion is folded to the desired shape (for example, a frustoconical shape as shown by way of example in the figures), and this is followed by the injection into the mould of the plastic material for forming the tubular element 3 and its various portions in the shape defined by the mould.

The co-moulding operation ends with the removal of the finished filter 1 from the mould.

It should be noted that the shape of the filter element in the tubular element 3 may also be ogival, that is to say still tapered towards one of its ends (which may be either closed or open), or cylindrical and closed at one end by the central body 20 which is associated, as described, with two or more arms 17 (which are preferably, but not necessarily, equally spaced). In the case of a cylindrical filter element, the fluid would be filtered in its passage through the (vertical) wall 24 of this element before passing out of the tubular element 3 through the openings 15A.

Finally, the filter element is intrinsically protected by the tubular element, making it unnecessary to add any other component (apart from the sealing elements in the annular recesses 11 and 12) to the tubular element, whereas this would be necessary in the currently known solutions.

One embodiment of the invention has been described. However, other embodiments are possible: for example, the tubular element may have a constant cross section and may not have two portions 8 and 9 with different cross sections as in the example of the figures described above; or the filter element 21 may be rotated through 180° from the position described and have its flattened end part facing the second end 7 (instead of the first end 6 as in the figures) of the tubular element 3. Again, this filter element may also be positioned asymmetrically in the element 3. Additionally, the filter may be used with any fluid, whether liquid or gaseous. These variants of the invention are also considered to fall within the scope of the invention defined by the claims below.

The invention claimed is:

1. A filter for injectors of fuel and/or oil, solutions, additives and fluids in general, whether liquid or gaseous, the filter comprising:
    a tubular element made of plastic material and having a tubular shape, open at opposite ends and internally hollow to have an internal cavity,
    the tubular element having on one wall of its internal cavity a plurality of projections spaced apart from one another, these projections interacting with portions of folds of a filter element of the pleated type associated with this tubular element and capable of filtering the fluid circulating through the tubular element,
    the filter element having a filter surface area,
    wherein the filter element and the tubular element are integrally fixed to each other to form a single filter co-mould of the filter,
    the filter element comprises a filter element body completely contained within the internal cavity of the tubular element and integrally fixed to the tubular element, the filter element having portions of the filter surface area free of this tubular element to allow the passage and filtration of the fluid circulating within the internal cavity of the tubular element,
    the tubular element having a portion positioned around and containing the filter element.

2. A method for producing the filter of claim 1 comprising the steps of:
    producing the filter element in an injection mould for plastic material,
    injecting, after the production of the filter element, the molten plastic material which can form the tubular element after the molten plastic material has cooled, and for removing the resulting filter from the mould,
    the filter element and tubular element forming a single filter body of the filter by being co-moulded,
    after the molding the filter element comprises the filter element body completely contained within the cavity of the tubular element, the filter element having portions of the filter surface area free of this tubular element to allow the passage and filtration of the fluid circulating within the internal cavity of the tubular element, the tubular element having a portion positioned around and containing the filter element.

3. The method according to claim 2, wherein a mesh portion forming the filter element is directly obtained in the mould by injecting material in the fluid state into the mould, this forming step being followed by the injection into the mould of the plastic material for forming the tubular element and its various portions in the space defined by the mould, the finished filter being removed from the mould at the end of the co-moulding operation.

4. The filter according to claim 1, wherein the portion of the tubular element positioned around and containing the filter element is near a first, open end of this tubular element, next to an opening in this end, protective elements being provided for the filter element.

5. The filter according to claim 4, wherein the protective elements are at least two arms running from the tubular element and terminating within a central body placed next to the filter element inserted into the internal cavity of this tubular element.

6. The filter according to claim 5, the body of the filter element has a flattened part orthogonal to a longitudinal axis (W) of the tubular element, from one edge of which flattened part there extends a wall forming the filter surface area of the filter element, the wall widening at a free end and being pleated, having a plurality of folds forming the portions interacting with the projections of the tubular element, these portions interacting with the projections being fixed to these projections, the flattened part being located next to a central body forming a means of protection of the filter element, the flattened part being fastened to this central body.

7. The filter of claim 5, wherein the internal cavity of the tubular element is hollow but for the filter element.

8. The filter of claim 5, wherein the filter element consists of filtering portion configured to capture any impurities contained in the filter element.

9. The filter of claim 5, wherein the folds define a plurality of recesses alternating with fins.

10. The filter of claim 5, wherein the filter element is only supported by the tubular element.

11. The filter of claim 10, wherein the pleated filter element defines recesses and fins, wherein the fins are integrally attached within the internal cavity of the tubular element.

12. The filter according to claim 1, wherein the filter element is positioned along a longitudinal axis (W) of the tubular element, in either a symmetrical or asymmetrical way relative to this longitudinal axis (W), the filter element body of the filter element being of tapered shape and centred on the longitudinal axis (W).

13. The filter according to claim 12, wherein the filter element has a cylindrical shape and is placed along the longitudinal axis (W) of the tubular element, this filter element having a vertical filter wall partly free of the tubular element and an end which is closed by the central body.

14. The filter according to claim 1, wherein the filter element body of the filter element has a flattened part orthogonal to a longitudinal axis (W) of the tubular element, from one edge of which flattened part there extends a wall forming the filter surface area of the filter element, the wall widening at a free end and being pleated, having a plurality of folds forming the portions interacting with the projections of the tubular element, these portions interacting with the projections being fixed to these projections, the flattened part being located next to a central body forming a means of protection of the filter element, the flattened part being fastened to this central body.

15. The filter according to claim 14, wherein the flattened part may face either one of the opposite ends of the tubular element.

16. The filter according to claim 1, wherein the folds form between them recesses alternating with fins, the tubular element having parts projecting towards a longitudinal axis (W) and corresponding to arms forming protective elements, these parts being inserted into some of the recesses in these folds, the parts and the arms being fixed to a filter wall or surface corresponding to the recesses.

17. The filter according to claim 16, wherein the folds form between them recesses alternating with fins, the tubular element having parts projecting towards a longitudinal axis (W) and corresponding to the arms forming protective elements, these parts being inserted into some of the recesses in these folds, the parts and the arms being fixed to the filter wall or surface corresponding to the recesses.

18. The filter of claim 1 for injectors of fuel and/or oil, solutions, additives and fluids for braking and/or transmission systems.

19. The filter of claim 1, wherein the internal cavity of the tubular element is hollow but for the filter element.

20. The filter of claim 1, wherein the filter element comprising the filter element body completely contained within the cavity of the tubular element and integrally fixed to the tubular element by being co-moulded, wherein a mesh portion forming the filter element body is directly obtained in the mould by injecting material in a fluid state into the mould, this forming step being followed by the injection into the mould of molten plastic material for forming the tubular element in a space defined by the mould, the finished filter being removed from the mould at the end of the co-moulding operation.

* * * * *